(12) United States Patent
Andrieu et al.

(10) Patent No.: US 6,290,733 B1
(45) Date of Patent: *Sep. 18, 2001

(54) PROCESS FOR THE PRODUCTION OF AN ELECTRIC CELL WITH A UNITARY STRUCTURE

(75) Inventors: Xavier Andrieu, Bretigny sur Orge; François Boudin, La Ville du Bois; Laurent Moreau, Paris, all of (FR); Ib Ingemann Olsen, Cockeysville, MD (US)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,052

(22) Filed: Nov. 25, 1997

(30) Foreign Application Priority Data

Jul. 17, 1997 (FR) .................................................. 97 09074

(51) Int. Cl.⁷ .................................................. H01M 10/38
(52) U.S. Cl. ........................................ 29/623.4; 29/623.5
(58) Field of Search ................................ 29/623.4, 623.5

(56) References Cited

U.S. PATENT DOCUMENTS

| | | |
|---|---|---|
| 3,023,261 | 2/1962 | Louis et al. . |
| 4,524,509 | 6/1985 | Wegner . |
| 4,885,007 | 12/1989 | Wegner . |
| 5,437,692 | 8/1995 | Dasgupta et al. . |
| 5,503,946 | 4/1996 | Fauteux et al. . |
| 5,637,421 | 6/1997 | Poehler et al. . |

FOREIGN PATENT DOCUMENTS

| | | |
|---|---|---|
| 196 50 765 A1 | 6/1997 | (DE) . |
| 0 038 885 A1 | 4/1981 | (EP) . |
| 0 243 653 A3 | 11/1987 | (EP) . |
| 0 511 491 A1 | 11/1992 | (EP) . |
| 0 600 718 A3 | 6/1994 | (EP) . |
| 0 618 629 A1 | 10/1994 | (EP) . |
| WO 96/20504 | 7/1996 | (WO) . |

OTHER PUBLICATIONS

6001 CHEMICAL ABSTRACTS, 118 (1993) Apr. 19, No. 16, corresponding to JP 4239041.

*Primary Examiner*—John S. Maples
(74) *Attorney, Agent, or Firm*—Sughrue, Mion, Zinn, Macpeak & Seas, PLLC

(57) ABSTRACT

In a process for the production of an organic electrolyte electric cell with a unitary structure comprising at least one pair of electrodes comprising a first electrode comprising the superposition of a first layer containing an electrochemically active material and a porous second layer constituted by a polymeric material and having a free face and a second electrode comprising a porous layer having at least one free face and containing an electrochemically active material the electrodes are assembled by adhesive bonding. The bonding is carried out by coating an adhesive onto the free face of the porous layer of one of the two electrodes and then bringing the free face coated with a film of adhesive into contact with the free face of the porous layer of the other electrode to form an electrochemical couple.

23 Claims, 1 Drawing Sheet

FIG_1
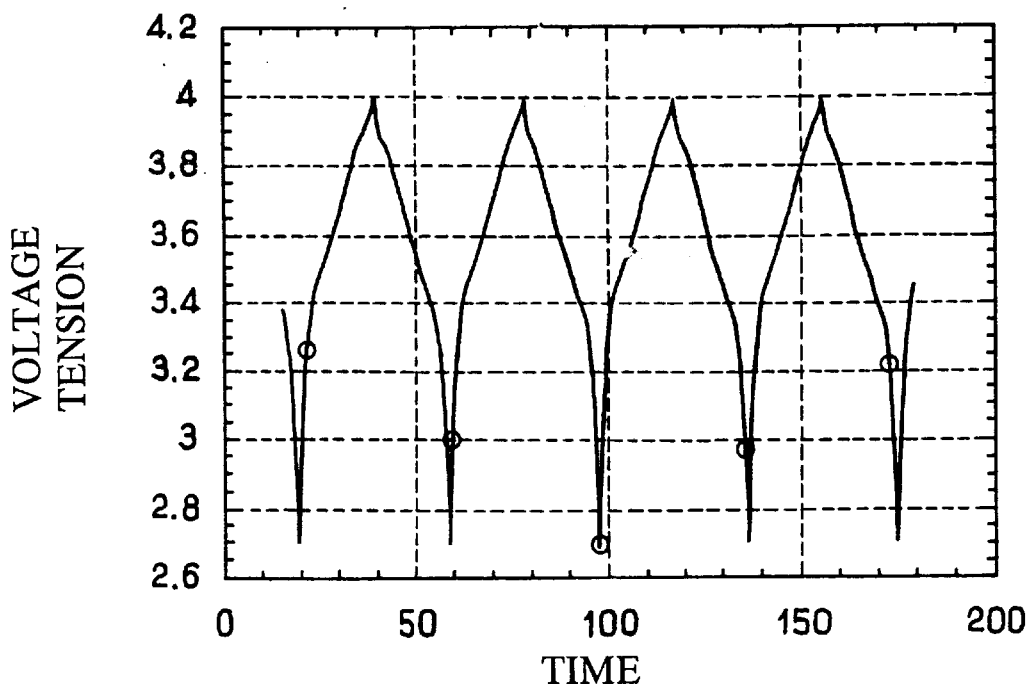
FIG_2
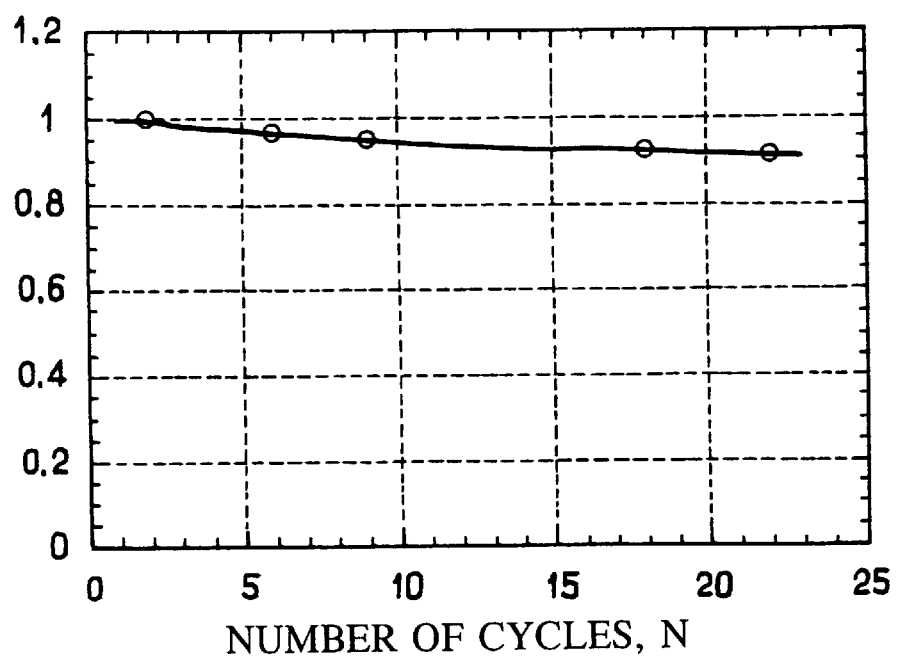

PROCESS FOR THE PRODUCTION OF AN ELECTRIC CELL WITH A UNITARY STRUCTURE

BACKGROUND OF THE INVENTION

1. Field of the invention

The present invention concerns a process for the production of an organic electrolyte electric cell with a unitary structure.

2. Description of the prior art

A cell with a unitary structure is a cell in which the elements constituting it, in particular the electrodes and the separator, are integral so that each element follows all of the dimensional variants of the cell during its operation.

A number of prior art documents propose a process for the production of a cell with a unitary structure which uses a plasticizing additive during assembly of the elements of the cell.

U.S. Pat. No. 5,456,600 describes a process for the production of a cell with a unitary structure which consists of adhering the cell elements, namely the electrodes, the separator and optionally the collectors, by rolling. Each element of the cell is in the form of a polymeric film, preferably based on a copolymer of polyvinylidene fluoride and hexafluoropropylene (PVDF-HFP). The separator and optionally the other elements of the cell contain a plasticizer which conserves the microstructure of the elements during rolling. The plasticizer is then eliminated by extracting it with a selective solvent.

In U.S. Pat. No. 5,540,741, a first electrode is constituted by a conductive support on which a paste containing a polymer, a plasticizing additive and an electrochemically active material are deposited. The polymer is preferably a copolymer of polyvinylidene fluoride and hexafluoropropylene (PVDF-HFP). After drying, the electrode is coated with a film which constitutes the separator. The electrode-separator assembly is then coated with a second electrode and heated under pressure.

The plasticizer is then extracted using a solvent which is inert towards the polymer.

U.S. Pat. No. 5,552,239 describes the same process as above using other polymers, such as polyvinyl chloride, acrylonitrile/butadiene copolymers and polyacrylonitrile polymers, to constitute the separator.

The three processes described above have the advantage of allowing the cell to be assembled in the open air. However, the plasticizer extraction step is lengthy and difficult.

The aim of the present invention is to provide a process for the production of an organic electrolyte electric cell with a unitary structure:

which comprises a limited number of simple steps;

which does not use a long and complex extraction step; and which can produce a cell with minimal dimensional variants.

SUMMARY OF THE INVENTION

The present invention thus provides a process for the production of an organic electrolyte electric cell with a unitary structure comprising at least one pair of electrodes comprising:

a first electrode comprising the superposition of a first layer containing an electrochemically active material and a porous second layer of a polymeric material having a free face; and a second electrode comprising a porous layer having at least one free face and containing an electrochemically active material;

wherein the electrodes are assembled by adhesive bonding, bonding being carried out by coating an adhesive onto the free face of the porous layer of one of the two electrodes and then bringing the free face coated with a film of adhesive into contact with the free face of the porous layer of the other electrode to form an electrochemical couple.

The first electrode comprising a superposition of two layers simultaneously:

functions as the seat of the electrochemical reaction, which uses the electrochemically active material contained in the first layer;

functions as the electrical separator to prevent any contact between the active material of the first electrode and that of the second, which is ensured by the second layer constituted by a polymeric material selected for its electrical insulating properties; and functions as a reservoir for the electrolyte since the second porous layer is constituted by a polymeric material which has a physicochemical affinity for the electrolyte.

In the present invention, the second layer of the first electrode advantageously has a gelled microporous structure which can optimize both the electrical separator function and the electrolyte reservoir function.

In a first variant of the process of the invention, the adhesive is a solution containing:

a polymer with the same chemical formula as the polymer constituting the second porous layer of the first electrode;

a solvent in which the polymer readily dissolves at the adhesive preparation temperature; and a non-solvent which is miscible with the solvent, which does not or only slightly dissolves the polymer at the adhesive preparation temperature and the proportion of which is insufficient to cause precipitation of the polymer.

Advantageously, the solvent has a boiling point in the range 40° C. to 80° C. and the non-solvent has a boiling point of more than 100° C.

The mass of the solvent represents 75% to 90% of the total mass of the solvent and the non-solvent and the mass of the polymer represents 10% to 20% of the mass of the adhesive solution.

The polymer is dissolved in the solvent and then the non-solvent is added to this mixture. The adhesive obtained is heated to a temperature at which the polymer/solvent/non-solvent mixture is stable and homogeneous during coating.

The polymer is advantageously selected from polyvinylidene fluoride (PVDF), polyvinyl chloride (PVC), polymethylmethacrylate, cellulose triacetate (CA), a polysulfone, a polyether, a polyolefin such as polyethylene (PE), polyethylene oxide (PEO), polypropylene (PP) and copolymers thereof.

The polymer can also be an alloy of polyvinylidene fluoride (PVDF) with a polymer selected from a polysulfone, polymethylmethacrylate, polyvinylpyrrolidone and copolymers of polyvinylidene fluoride and polytetrafluoroethylene (PTFE), polyvinylidene fluoride and propylene hexafluoride and polyvinyl acetate (PVAC) and polyvinyl alcohol (PVA).

In a further embodiment of the process of the invention the polymer is an alloy constituted by an elastomeric polymer and a polymer which swells in the organic electrolyte.

The elastomeric polymer improves the mechanical properties of the second layer by limiting dimensional variants.

The elastomeric polymer can be selected from polyurethanes, an acrylonitrile-butadiene copolymer, a styrene-butadiene-styrene copolymer, a styrene-isoprene-styrene copolymer, polyesters and amide block polyethers.

The polymer which swells in the organic electrolyte must have a certain affinity for the electrolyte but without dissolving in the electrolyte at temperatures in the range 50° C. to 80° C. This polymer can be selected from polyvinylidene fluoride and its copolymers, polyacrylonitrile, polymethylmethacrylate, polyvinylformal, polybutylmethacrylate and polyvinyl chloride.

In the first variant of the process of the invention the polymer is preferably polyvinylidene fluoride. In this case the solvent is selected from acetone and tetrahydrofuran. The non-solvent is selected from butanol, propanol and ethylene glycol.

The skilled person can determine which solvent and which non-solvent are the most suitable for preparing the adhesive of the invention, depending on the polymer selected.

To this end, physico-chemical data in the literature concerning the selected polymer would be consulted in order to determine which solvents dissolve the polymer readily at the adhesive preparation temperature and which non-solvents miscible with the solvent do not dissolve or only very slightly dissolve the polymer at the adhesive preparation temperature.

In the first variant of the process of the invention the electrochemical couple formed is rolled, dried for 10 minutes at a temperature of about 20° C. and then vacuum dried for about 12 hours.

In a second variant of the process of the invention the adhesive is a paste constituted by the electrochemically active material of the porous layer of the second electrode, a polymer and a solvent which dissolves the polymer.

The polymer is preferably selected from polytetrafluoroethylene, carboxymethylcellulose, hydroxypropylmethylcellulose, hydroxyethylcellulose, hydroxypropylcellulose, polyvinylidene fluoride and its copolymers, polyacrylonitrile, polyacrylic acid, polyacrylamide and mixtures thereof.

The solvent is selected from water and N-methylpyrrolidone.

The porous layer of the second electrode and the first layer of the first electrode are produced using the usual methods, such as depositing a paste on a conductive support.

The conductor support is an expanded metal, a grid, a fabric, a strip or a metal sponge, based on copper or aluminum, for example.

The paste used to produce the porous layer of the second electrode or the first layer of the first electrode advantageously has the same composition as the adhesive of the invention, constituted by the electrochemically active material of the porous layer of the second electrode, the polymer and the solvent which dissolves the polymer.

In the second variant of the process of the invention the electrochemical couple formed is rolled and then dried for 10 minutes at a temperature of about 80° C.

The thickness of the porous second layer of the first electrode used in the first or second variant of the process of the invention is preferably in the range 15 $\mu$m to 100 $\mu$m.

Further, once dry, the adhesive is a porous film with a thickness which is preferably in the range 5 $\mu$m to 20 $\mu$m.

The thickness of the first layer of the first electrode and the thickness of the porous layer of the second electrode are advantageously in the range 100 $\mu$m to 160 $\mu$m.

The porosity of the porous layers in each electrode is advantageously in the range 30% to 95%, preferably in the range 35% to 40%.

The electrode comprising the superposition of two layers used to carry out the process of the invention is produced by first producing the first layer and then coating the first layer with a film of a solution of the polymer selected to constitute the second layer. The film is then dried to eliminate the solvent or solvents constituting the polymer solution.

In a first embodiment the electrode comprising two layers is produced by means of phase inversion by immersion.

In this first embodiment the solution is the polymer dissolved in a solvent. The first layer is then coated with a film of the solution and the film is brought into contact with a non-solvent which is miscible with the solvent.

In a second embodiment the electrode comprising two layers is produced by means of phase inversion by evaporation.

In this second embodiment the solution is the polymer dissolved in a volatile solvent to which a less volatile non-solvent which is miscible with the solvent is added in a proportion which is insufficient to cause precipitation of the polymer.

In the present invention, it is advantageous to produce the second layer of the electrode comprising two layers from the solution used as the adhesive in the first variant of the process of the invention described above.

Further characteristics and advantages of the present invention will become clear from the following examples which are given by way of non-limiting illustration with reference to FIGS. 1 and 2.

BRIEF DESCRIPTION OF THE DRAWINGS

FIG. 1 shows the evolution of the voltage of the cell of the invention during cycling; the cell voltage in volts is plotted on the ordinate axis and time in hours is plotted on the abscissa axis.

FIG. 2 shows the evolution of the ratio of the discharge capacity of the cell of the invention in the Nth cycle to the discharge capacity of the cell in the first cycle during cycling. This ratio, which is less than unity, is plotted on the ordinate axis and the number of cycles N is plotted on the abscissa axis.

DETAILED DESCRIPTION OF THE PREFERRED EMBODIMENTS

EXAMPLE 1

Preparation of a First Electrode Comprising a Layer Containing Graphite as the Electrochemically Active Material.

A paste constituted by 12% by weight of graphite powder, 2% by weight of polyacrylic acid and 86% by weight of water was prepared.

The paste was obtained by mixing polyacrylic acid in water for about half an hour at room temperature, with stirring. When the solution was translucent the graphite powder was incorporated and stirring was continued until the mixture was homogeneous.

Expanded copper was then coated with this paste and the electrode was placed in an oven at 80° C. for 2 hours.

The graphite electrode obtained comprised a porous layer of graphite and polyacrylic acid with a thickness of 140 $\mu$m and with 40% porosity.

Preparation of a Second Electrode Comprising Superposition of Two Layers.

An electrode comprising a first layer containing $LiNiO_2$ as the electrochemically active material was coated with a solution of 75% by weight acetone, 12.5% by weight butanol and 12.5% by weight polyvinylidene fluoride.

This solution was obtained by dissolving the polyvinylidene fluoride in acetone and then adding the butanol.

The $LiNiO_2$ electrode was then dried at a temperature of the order of 20° C. for 12 hours.

The electrode comprised the superposition of a first layer containing $LiNiO_2$ and a second layer constituted by polyvinylidene fluoride. The second layer, which acted as a separator, had a thickness of 50 μm and 70% porosity.

Adhesive Bonding

The electrode comprising a first layer of $LiNiO_2$ and a second layer of polyvinylidene fluoride was coated with the same solution as that used to produce the second layer, the solution acting as an adhesive at this stage of the process.

The adhesive-coated electrode was immediately assembled with the graphite electrode produced previously.

The electrochemical couple obtained could optionally be rolled or simply placed between two metal plates under pressure to render the thickness of the adhesive film uniform.

The electrochemical couple was dried at room temperature for 10 minutes and then vacuum dried for 12 hours before being impregnated with an electrolyte composed of a solution of $LiPF_6$ with a concentration of 1 M in a mixture of propylene carbonate/ethylene carbonate/dimethyl carbonate in a proportion of 1/1/3.

The electrochemical couple impregnated in this way was mounted in a button cell then cycled at a rate of C/20 for charge and discharge at a temperature of 60° C.

FIG. 1 and FIG. 2 respectively show the evolution during this cycling of the voltage and the ratio of the discharge capacity of the cell in the Nth cycle to the discharge capacity of the cell in the first cycle.

EXAMPLE 2

Preparation of an Electrode Comprising One Layer and an Electrode Comprising a Superposition of Two Layers.

The same conditions were used as those given for Example 1.

Adhesive Bonding

The electrode comprising one layer of graphite and polyacrylic acid was coated with the same paste as that used to form the layer, the paste acting as the adhesive at this stage of the process.

The graphite electrode coated with adhesive was immediately assembled with the electrode formed in Example 1 comprising a first layer of $LiNiO_2$ and a second layer of polyvinylidene fluoride.

The electrochemical couple obtained could optionally be rolled or simply placed between two metal plates under pressure to render the thickness of the adhesive film uniform.

The electrochemical couple was then dried for 12 hours in an oven at 80° C.

What is claimed is:

1. A process for the production of an organic electrolyte electric cell having a unitary structure comprising at least one pair of electrodes comprising:

a first electrode comprising the superposition of a first layer containing an electrochemically active material and a porous second layer of a polymeric material having a free face; and a second electrode comprising a porous layer having at least one free face and containing an electrochemically active material;

wherein said electrodes are assembled by adhesive bonding, bonding being carried out by coating an adhesive onto said free face of said porous layer of one of said two electrodes and then bringing said free face coated with a film of adhesive into contact with said free face of said porous layer of said other electrode to form an electrochemical couple, and wherein said electrochemical couple is dried and then impregnated with an electrolyte.

2. The process claimed in claim 1, further comprising a step of preparing said adhesive coating from a solution containing a polymer with the same chemical formula as said polymer constituting said second porous layer of said first electrode, a solvent in which said polymer readily dissolves at an adhesive preparation temperature; and a non-solvent which is miscible with said solvent and which does not, or only slightly, dissolves said polymer at said adhesive preparation temperature and the proportion of which is insufficient to cause precipitation of said polymer.

3. A process for the production of an organic electrolyte electric cell with a unitary structure comprising at least one pair of electrodes comprising:

a first electrode comprising the superposition of a first layer containing an electrochemically active material and a porous second layer of a polymeric material having a free face; and a second electrode comprising a porous layer having at least one free face and containing an electrochemically active material, wherein said electrodes are assembled by adhesive bonding, bonding being carried out by coating an adhesive onto said free face of said porous layer of one of said two electrodes and then bringing said free face coated with a film of adhesive into contact with said free face of said porous layer of said other electrode to form an electrochemical couple, wherein said adhesive is a solution containing:

a polymer with the same chemical formula as said polymer constituting said second porous layer of said first electrode;

a solvent in which said polymer readily dissolves at an adhesive preparation temperature; and a non-solvent which is miscible with said solvent, which does not or only slightly dissolves said polymer at said adhesive preparation temperature and the proportion of which is insufficient to cause precipitation of said polymer, and wherein said solvent has a boiling point in the range 40° C. to 80° C. and said non-solvent has a boiling point of more than 100° C.

4. The process of claim 3, further comprising the step of drying said electrochemical couple to convert said adhesive into a porous film.

5. The process claimed in claim 3, wherein the mass of said solvent represents 75% to 90% of the total mass of said solvent and said non-solvent.

6. The process claimed in claim 3, wherein the mass of said polymer represents 10% to 20% of the mass of said adhesive solution.

7. The process claimed in claim 3, wherein said adhesive is heated to a temperature at which said polymer/solvent/non-solvent mixture is stable and homogenous during coating.

8. The process claimed in claim 3, wherein said polymer comprises at least one of polyvinylidene fluoride (PVDF), polyvinyl chloride (PVC), polymethylmethacrylate, cellulose triacetate (CA), a polysulfone, a polyether, a polyolefin, polyethylene oxide (PEO), polypropylene (PP) and copolymers thereof.

9. The process claimed in claim 8, wherein said polymer is polyvinylidene fluoride.

10. The process claimed in claim 9, wherein said solvent is selected from acetone and tetrahydrofuran.

11. The process claimed in claim 9, wherein said non-solvent comprises at least one of butanol, propanol and ethylene glycol.

12. The process claimed in claim 3, wherein said polymer is an alloy of polyvinylidene fluoride (PVDF) with a polymer comprising at least one of polysulfone, polymethylmethacrylate, polyvinylpyrrolidone and copolymers of polyvinylidene fluoride and polytetrafluoroethylene (PTFE), polyvinylidene flouride and propylene hexafluoride and polyvinyl acetate (PVAC) and polyvinyl alcohol (PVA).

13. The process claimed in claim 3, wherein said polymer is an alloy constituted by a polymer comprising at least one of polyurethanes, an acrylonitrile-butadiene copolymer, a styrene-butadicne-styrene copolymer, a styrene-isoprene-styrene copolymer, polyesters, amide block polyethers and a polymer selected from the group consisting of polyvinylidene fluoride and its copolymers, polyacrylonitrile, polymethylmethacrylate, polyvinylformal, polybutylmethacrylate and polyvinylchloride.

14. The process claimed in claim 3, wherein a thickness of said porous second layer of said first electrode is in a range 15 μm to 100 μm.

15. The process claimed in claim 3, wherein, when dry, said adhesive is a porous film with a thickness in a range 5 μm to 20 μm.

16. The process claimed in claim 3, wherein a thickness of said first layer of said first electrode and the thickness of said porous layer of said second electrode are in a range 100 μm to 160 μm.

17. The process claimed in claim 3, wherein a porosity of said porous layers in each of said electrodes is in a range 35% to 40%.

18. A process for the production of an organic electrolyte electric cell with a unitary structure comprising at least one pair of electrodes comprising:
   a first electrode comprising the superposition of a first layer containing an electrochemically active material and a porous second layer of a polymeric material having a free face; and
   a second electrode comprising a porous layer having at least one free face and containing an electrochemically active material, wherein said electrodes are assembled by adhesive bonding, bonding being carried out by coating an adhesive onto said free face of said porous layer of one of said two electrodes and then bringing said free face coated with a film of adhesive into contact with said free face of said porous layer of said other electrode to form an electrochemical couple, wherein said adhesive is a solution containing:
   a polymer with the same chemical formula as said polymer constituting said second porous layer of said first electrode;
   a solvent in which said polymer readily dissolves at an adhesive preparation temperature; and
   a non-solvent which is miscible with said solvent, which does not or only slightly dissolves said polymer at said adhesive preparation temperature and the proportion of which is insufficient to cause precipitation of said polymer, and wherein said electrochemical couple formed is rolled, dried for 10 minutes at a temperature of about 20° C. and then vacuum dried for about 12 hours.

19. A process for the production of an organic electrolyte electric cell with a unitary structure comprising at least one pair of electrodes comprising:
   a first electrode comprising the superposition of a first layer containing an electrochemically active material and a porous second layer of a polymeric material having a free face; and
   a second electrode comprising a porous layer having at least one free face and containing an electrochemically active material, wherein said electrodes are assembled by adhesive bonding, bonding being carried out by coating an adhesive onto said free face of said porous layer of one of said two electrodes and then bringing said free face coated with a film of adhesive into contact with said free face of said porous layer of said other electrode to form an electrochemical couple, and wherein said adhesive is a paste constituted by said electrochemically active material of said porous layer of said second electrode, a polymer and a solvent which dissolves said polymer.

20. The process claimed in claim 19 wherein said solvent comprises at least one of water and N-methylpyrrolidone.

21. The process claimed in claim 19 wherein said electrochemical couple formed is rolled then dried for 10 minutes at a temperature of about 80° C.

22. The process claimed in claim 19, wherein said polymer comprises at least one of polytetrafluoroethylene, carboxymethycellulose, hydroxypropylmcthylcellulose, hydroxycthylcellulose, hydroxypropylcellulose, polyvinylidene fluoride and its copolymers, polyacrylonitrile, polyacrylic acid, polyacrylamide and mixtures thereof.

23. The process of claim 14, further comprising the step of drying said electrochemical couple to convert said adhesive into a porous film.

* * * * *